(12) United States Patent
He et al.

(10) Patent No.: US 11,260,828 B2
(45) Date of Patent: Mar. 1, 2022

(54) METHOD AND APPARATUS FOR CONTROLLING VEHICLE, AND VEHICLE

(71) Applicant: BYD COMPANY LIMITED, Guangdong (CN)

(72) Inventors: Weimin He, Shenzhen (CN); Huizhao Ye, Shenzhen (CN); Huilin Song, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 0 days.

(21) Appl. No.: 16/642,321

(22) PCT Filed: Aug. 31, 2018

(86) PCT No.: PCT/CN2018/103432
§ 371 (c)(1),
(2) Date: Feb. 26, 2020

(87) PCT Pub. No.: WO2019/042390
PCT Pub. Date: Mar. 7, 2019

(65) Prior Publication Data
US 2021/0070253 A1 Mar. 11, 2021

(30) Foreign Application Priority Data
Aug. 31, 2017 (CN) .......................... 201710775717.7

(51) Int. Cl.
*B60R 25/24* (2013.01)
*B60R 25/20* (2013.01)
*B60R 25/33* (2013.01)

(52) U.S. Cl.
CPC ........ *B60R 25/248* (2013.01); *B60R 25/2018* (2013.01); *B60R 25/245* (2013.01); *B60R 25/33* (2013.01)

(58) Field of Classification Search
None
See application file for complete search history.

(56) References Cited

U.S. PATENT DOCUMENTS

| 6,313,791 B1 | 11/2001 | Klanke |
| 2004/0093291 A1 | 5/2004 | Bodin |

(Continued)

FOREIGN PATENT DOCUMENTS

| CN | 201604613 U | 10/2010 |
| CN | 201980186 U | 9/2011 |

(Continued)

OTHER PUBLICATIONS

Search Report for International Application No. PCT/CN2018/103432 dated Nov. 23, 2018.

*Primary Examiner* — Carlos Garcia
(74) *Attorney, Agent, or Firm* — Calfee Halter & Griswold LLP

(57) ABSTRACT

A method for controlling a vehicle is applied to an in-vehicle terminal, includes: obtaining current position information of a vehicle and a preset electronic fence, determining a travel direction according to the current position information and the preset electronic fence; when determining that the vehicle travels from the inside of the preset electronic fence to the outside of the preset electronic fence, determining a current position state of the vehicle according to the current position information, where the position state represents a relative position of the vehicle and the preset electronic fence; determining whether the current position state is the same as a previous position state of the vehicle; and when the current position state is different from the previous position state, performing one or two of outputting warning information and sending a key shielding signal, to enable a key controller to shield a key control signal of the vehicle.

17 Claims, 3 Drawing Sheets

(56) References Cited

U.S. PATENT DOCUMENTS

| | | | |
|---|---|---|---|
| 2011/0130945 A1 | 6/2011 | Deedy et al. | |
| 2012/0089271 A1* | 4/2012 | Silzer, Sr | G05D 1/0297 701/1 |
| 2013/0238366 A1* | 9/2013 | Morgan | G08G 1/205 705/4 |
| 2014/0156110 A1* | 6/2014 | Ehrman | G08G 1/00 701/2 |

FOREIGN PATENT DOCUMENTS

| | | |
|---|---|---|
| CN | 104181881 A | 12/2014 |
| CN | 105761328 A | 7/2016 |
| CN | 105774546 A | 7/2016 |
| CN | 105807680 A | 7/2016 |
| CN | 105872065 A | 8/2016 |
| CN | 106740671 A | 5/2017 |
| KR | 20160143252 A | 12/2016 |
| WO | 2013030932 A1 | 3/2013 |
| WO | 2016090993 A1 | 6/2016 |

* cited by examiner

METHOD AND APPARATUS FOR CONTROLLING VEHICLE, AND VEHICLE

CROSS-REFERENCE TO RELATED APPLICATIONS

This application is based on International Application No. PCT/CN2018/103432, filed on Aug. 31, 2018, and claims priority to Chinese Patent Application No. 201710775717.7, filed on Aug. 31, 2017. The entire contents of the above-referenced applications are incorporated herein by reference.

FIELD

This disclosure relates to the field of vehicle technologies, and specifically, to a method for controlling a vehicle, an apparatus for controlling a vehicle, and a vehicle.

BACKGROUND

With rapid development of society and economy, more credit vehicles, rental vehicles, and online-hailing vehicles flood the market. However, security problems frequently occur in the above types of vehicles. For example, for the purpose of evasion of legal responsibility or revenge on a car rental company due to a private contradiction, a driver may drive a vehicle to a remote region. Consequently, the car rental company needs to use a lot of human, material and financial resources to find the vehicle, causing a huge loss to the car rental company.

SUMMARY

This disclosure is to resolve one of technical problems in the related art at least to some extent. Therefore, the first objective of this disclosure is to provide a method for controlling a vehicle. In the method, the vehicle can be automatically managed and controlled, which saves time and effort.

The second objective of this disclosure is to provide an apparatus for controlling a vehicle.

The third objective of this disclosure is to provide a vehicle.

To implement the first objective, a first aspect of embodiments of this disclosure provides a method for controlling a vehicle, applied to an in-vehicle terminal. The method includes: obtaining current position information of a vehicle and a preset electronic fence, and determining a travel direction of the vehicle according to the current position information and the preset electronic fence; determining a current position state of the vehicle according to the current position information when it is determined that the vehicle travels from the inside of the preset electronic fence to the outside of the preset electronic fence, where the position state represents a relative position of the vehicle and the preset electronic fence; determining whether the current position state is the same as a previous position state of the vehicle; and when the current position state is different from the previous position state, performing one or two of outputting warning information and sending a key shielding signal, to enable a key controller to shield a key control signal of the vehicle.

The method for controlling a vehicle in this disclosure is applied to the in-vehicle terminal, and warning is performed or a key signal of the vehicle is restricted according to the current position state of the vehicle. Therefore, automatic management and control for the vehicle can be implemented without manual intervention, which saves more time and effort than manual management and control.

In some embodiments, the determining a current position state of the vehicle according to the current position information includes: when the current position information is located inside the preset electronic fence, determining that the current position state of the vehicle is that the vehicle is located inside the preset electronic fence; or when the current position information is located outside the preset electronic fence, determining that the current position state of the vehicle is that the vehicle is located outside the preset electronic fence.

In some embodiments, the performing one or two of outputting warning information and sending a key shielding signal, to enable a key controller to shield a key control signal of the vehicle includes: when the current position state is that the vehicle is located outside the preset electronic fence, sending the key shielding signal, to enable the key controller to shield the key control signal of the vehicle, or outputting the warning information and sending the key shielding signal, to enable the key controller to shield the key control signal of the vehicle.

In some embodiments, the preset electronic fence includes a preset inner fence and a preset outer fence, and the determining a current position state of the vehicle according to the current position information includes: when the current position information is located inside the preset inner fence, determining that the current position state of the vehicle is that the vehicle is located inside the preset inner fence; or when the current position information is located between the preset inner fence and the preset outer fence, determining that the current position state of the vehicle is that the vehicle is located outside the preset inner fence and located inside the preset outer fence; or when the current position information is located outside the preset outer fence, determining that the current position state of the vehicle is that the vehicle is located outside the preset outer fence.

In some embodiments, the performing one or two of outputting warning information and sending a key shielding signal, to enable a key controller to shield a key control signal of the vehicle includes: when the current position state is that the vehicle is located outside the preset inner fence and located inside the preset outer fence, outputting the warning information; or when the current position state is that the vehicle is located outside the preset outer fence, sending the key shielding signal, to enable the key controller to shield the key control signal of the vehicle, or outputting the warning information and sending the key shielding signal, to enable the key controller to shield the key control signal of the vehicle.

In some embodiments, before the sending the key shielding signal, to enable the key controller to shield the key control signal of the vehicle, the method further includes: determining whether the vehicle is shut down; and the enabling the key controller to shield the key control signal of the vehicle includes: when it is determined that the vehicle is shut down, sending the key shielding signal, to enable the key controller to shield the key control signal of the vehicle. Therefore, an accident caused by a sudden limitation on vehicle operation can be avoided, which improves security.

In some embodiments, the method further includes: when one or two of outputting the warning information and sending the key shielding signal are performed, uploading alarm information to a monitoring server to remind a vehicle administrator.

To achieve the second objective, a second aspect of the embodiments of this disclosure provides an apparatus for controlling a vehicle applied to an in-vehicle terminal. The apparatus includes: an obtaining module, configured to obtain current position information of a vehicle and a preset electronic fence; a first determining module, configured to determine a travel direction of the vehicle according to the current position information and the preset electronic fence; a second determining module, configured to determine a current position state of the vehicle according to the current position information when it is determined that the vehicle travels from the inside of the preset electronic fence to the outside of the preset electronic fence, where the position state represents a relative position of the vehicle and the preset electronic fence; a third determining module, configured to determine whether the current position state is the same as a previous position state of the vehicle; and a performing module, configured to: when the current position state is different from the previous position state, perform one or two of outputting warning information and sending a key shielding signal, to enable a key controller to shield a key control signal of the vehicle.

In the apparatus for controlling a vehicle in the embodiments of this disclosure, warning is performed or a key signal of the vehicle is restricted according to the current position state of the vehicle. Therefore, automatic management and control for the vehicle can be implemented without manual intervention, which saves more time and effort than manual management and control.

In some embodiments, when determining the current position state of the vehicle according to the current position information, the second determining module is specifically configured to: when the current position information is located inside the preset electronic fence, determine that the current position state of the vehicle is that the vehicle is located inside the preset electronic fence; or when the current position information is located outside the preset electronic fence, determine that the current position state of the vehicle is that the vehicle is located outside the preset electronic fence.

In some embodiments, when performing one or two of outputting the warning information and sending the key shielding signal, to enable the key controller to shield the key control signal of the vehicle, the performing module is specifically configured to: when the current position state is that the vehicle is located outside the preset electronic fence, send the key shielding signal, to enable the key controller to shield the key control signal of the vehicle, or output the warning information and send the key shielding signal, to enable the key controller to shield the key control signal of the vehicle.

In some embodiments, the preset electronic fence includes a preset inner fence and a preset outer fence, and when determining the current position state of the vehicle according to the current position information, the second determining module is specifically configured to: when the current position information is located inside the preset inner fence, determine that the current position state of the vehicle is that the vehicle is located inside the preset inner fence; or when the current position information is located between the preset inner fence and the preset outer fence, determine that the current position state of the vehicle is that the vehicle is located outside the preset inner fence and located inside the preset outer fence; or when the current position information is located outside the preset outer fence, determine that the current position state of the vehicle is that the vehicle is located outside the preset outer fence.

In some embodiments, the performing module is configured to: when the current position state is that the vehicle is located outside the preset inner fence and located inside the preset outer fence, output the warning information; or when the current position state is that the vehicle is located outside the preset outer fence, send the key shielding signal, to enable the key controller to shield the key control signal of the vehicle, or output the warning information and send the key shielding signal, to enable the key controller to shield the key control signal of the vehicle.

In some embodiments, the apparatus for controlling a vehicle further includes: a fourth determining module, configured to determine whether the vehicle is shut down, where the performing module is configured to: when it is determined that the vehicle is shut down, send the key shielding signal, to enable the key controller to shield the key control signal of the vehicle. Therefore, an accident caused by a sudden limitation on vehicle operation can be avoided, which improves security.

In some embodiments, the apparatus for controlling a vehicle further includes: an uploading module, configured to: when the performing module performs one or two of outputting the warning information and sending the key shielding signal, upload alarm information to a monitoring server to remind a vehicle administrator.

To achieve the third objective, a third aspect of the embodiments of this disclosure provides a vehicle, including a key controller and the apparatus for controlling a vehicle in the second aspect of the embodiments. The key controller is connected to the apparatus for controlling a vehicle.

In the vehicle of this disclosure, by using the apparatus for controlling a vehicle in the foregoing embodiments, automatic management and control for the vehicle can be implemented without manual intervention, which saves more time and effort than manual management and control.

Other features and advantages of this disclosure are described in detail in subsequent specific implementations.

BRIEF DESCRIPTION OF THE DRAWINGS

The accompanying drawings are provided to further understand this disclosure, and constitute a part of this specification. The accompanying drawings, together with the following specific implementations, are used to explain this disclosure, and are not construed as a limitation to this disclosure. In the accompanying drawings.

DETAILED DESCRIPTION

The following describes specific implementations of this disclosure in detail with reference to the accompanying drawings. It should be understood that, the described specific implementations herein are only used to illustrate and explain this disclosure, and are not intended to limit this disclosure.

Figure 1:
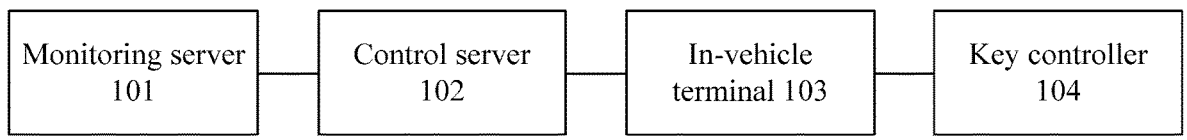
FIG. 1 is a block diagram of a system for controlling a vehicle according to an embodiment of this disclosure.

Embodiments of this disclosure may be applied to a system for controlling a vehicle. As shown in FIG. 1, the system includes: a monitoring server 101, a control server 102 connected to the monitoring server 101, an in-vehicle terminal 103 connected to the control server 102, and a key controller 104 connected to the in-vehicle terminal 103. Both the in-vehicle terminal 103 and the key controller 104 are mounted on the vehicle.

The monitoring server 101 may provide an application interface to an administrator for operation. The administrator may perform any one or two of registration and login through the application interface. For example, the administrator may input information such as a user name and a password in the application interface, to complete the login. A map is also shown in the application interface. The administrator may manually draw an electronic fence (which is equivalent to a preset electronic fence in this disclosure) by using the map shown in the application interface, and binds identification information of the vehicle with the electronic fence. The identification information may be a vehicle identification number (VIN). The electronic fence bound with the identification information of the vehicle is sent to the control server 102.

The control server 102 receives the electronic fence that is bound with the identification information of the vehicle and that is sent by the monitoring server 101, and determines whether a connection between the control server 102 and the in-vehicle terminal 103 corresponding to the identification information of the vehicle is normal. When the connection is normal, the control server 102 sends the electronic fence to the in-vehicle terminal 103 corresponding to the identification information of the vehicle. The control server may be a controller area network (CAN) server.

After receiving the electronic fence, the in-vehicle terminal 103 may obtain current position information of the vehicle, and determine a travel direction of the vehicle according to the current position information. When it is determined, according to the travel direction, that the vehicle travels from the inside of the preset electronic fence to the outside of the preset electronic fence, a current position state of the vehicle is determined according to the current position information. When the current position state is different from a previous position state, warning information is output or a key controller is controlled to shield a key control signal of the vehicle. A shielding instruction may be sent to the key controller, to enable the key controller 104 to shield the key control signal of the vehicle according to the shielding instruction sent by the in-vehicle terminal 103.

The following describes this disclosure in detail by using specific embodiments.

Figure 2:
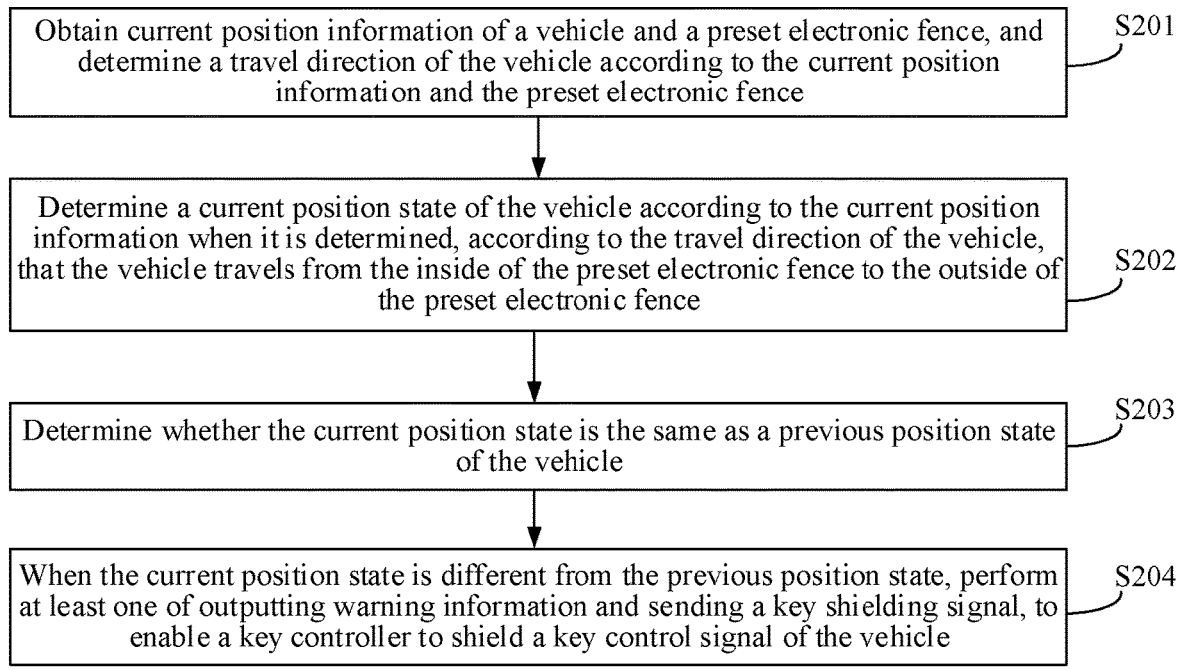
FIG. 2 is a flowchart of a method for controlling a vehicle according to an embodiment of this disclosure.

FIG. 2 shows a method for controlling a vehicle according to an embodiment of this disclosure. As shown in FIG. 2, the method is applied to an in-vehicle terminal, and includes:

S201. Obtain current position information of a vehicle and a preset electronic fence, and determine a travel direction of the vehicle according to the current position information and the preset electronic fence.

The preset electronic fence may include two types: One is that the preset electronic fence may be one preset fence. For example, if the vehicle is rent to Shenzhen, the preset electronic fence is Shenzhen. The other is that the preset electronic fence may include a preset inner fence and a preset outer fence, and a range of the preset outer fence is greater than a range of the preset inner fence. For example, if the vehicle is rent to Shenzhen, the preset outer fence may be Guangdong province, and the preset inner fence may be Shenzhen. The foregoing examples are only used for description, and are not limited in this disclosure.

In this step, previous position information of the vehicle may be obtained, and the travel direction of the vehicle is determined according to the previous position information and the current position information.

S202. Determine a current position state of the vehicle according to the current position information when it is determined, according to the travel direction of the vehicle, that the vehicle travels from the inside of the preset electronic fence to the outside of the preset electronic fence.

The position state represents a relative position of the vehicle and the preset electronic fence. It should be noted that, when the preset electronic fence includes one fence, if the current position information is located inside the preset electronic fence, it may be determined that the current position state of the vehicle is that the vehicle is located inside the preset electronic fence. If the current position information is located outside the preset electronic fence, it is determined that the current position state of the vehicle is that the vehicle is located outside the preset electronic fence. When the preset electronic fence includes a preset inner fence and a preset outer fence, if the current position information is located inside the preset inner fence, it is determined that the current position state of the vehicle is that the vehicle is located inside the preset inner fence. If the current position information is located between the preset inner fence and the preset outer fence, it is determined that the current position state of the vehicle is that the vehicle is located outside the preset inner fence and located inside the preset outer fence. If the current position information is located outside the preset outer fence, it is determined that the current position state of the vehicle is that the vehicle is located outside the preset outer fence.

S203. Determine whether the current position state is the same as a previous position state of the vehicle.

S204. When the current position state is different from the previous position state, perform one or two of outputting warning information and sending a key shielding signal, to enable a key controller to shield a key control signal of the vehicle.

By using the above method, according to position states of the vehicle, the in-vehicle terminal may automatically output the warning information or control the key controller to shield the key control signal of the vehicle without manual intervention, thereby saving human resources.

Figure 3:
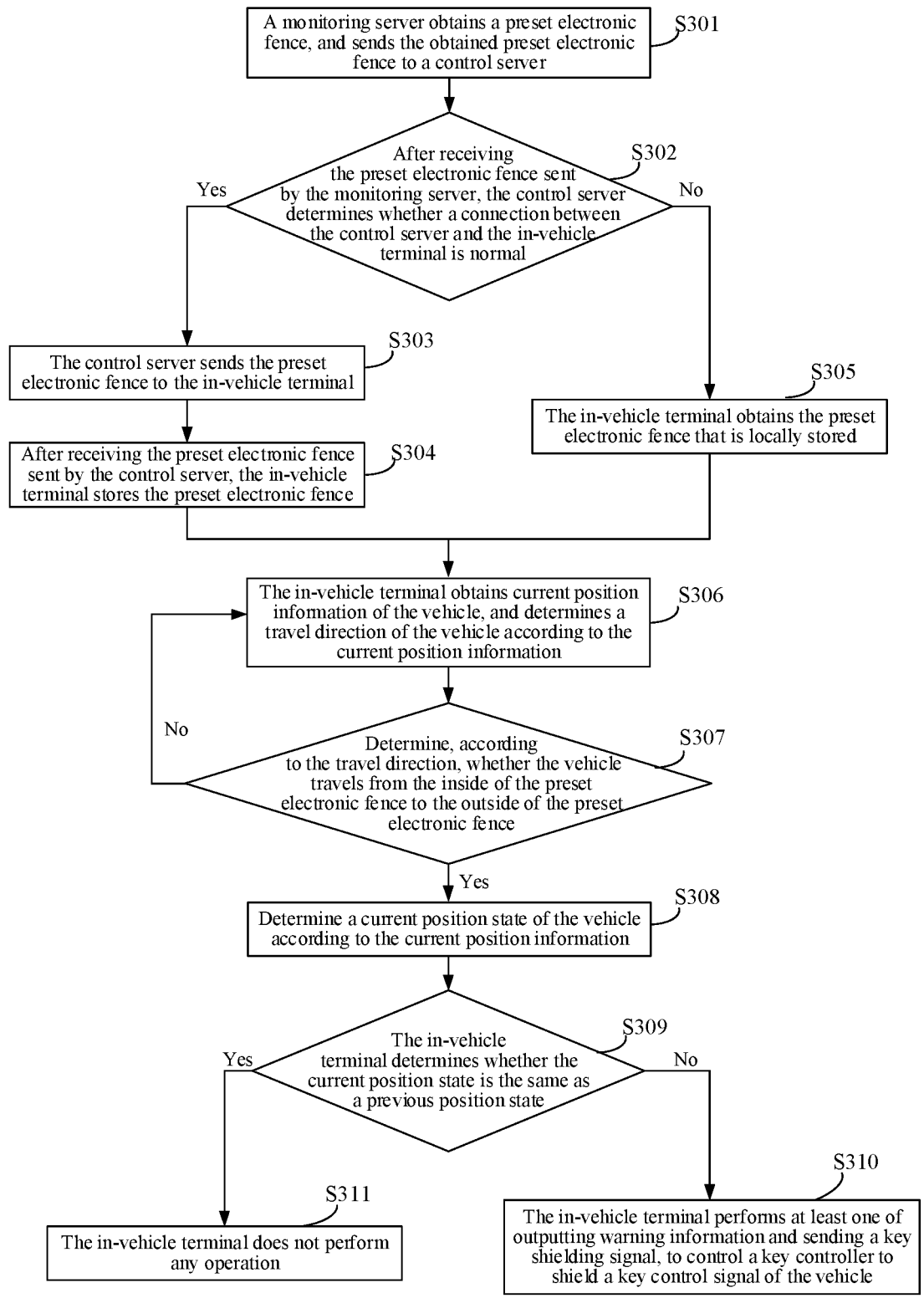
FIG. 3 is a flowchart of a method for controlling a vehicle according to an embodiment of this disclosure.

FIG. 3 shows a method for controlling a vehicle according to an embodiment of this disclosure. As shown in FIG. 3, the method may be based on the system for controlling a vehicle shown in FIG. 1, and the method includes:

S301. A monitoring server obtains a preset electronic fence, and sends the obtained preset electronic fence to a control server.

The control server may be a CAN server. The preset electronic fence may include two types: One is that the preset electronic fence may be one preset fence. For example, if the vehicle is rent to Shenzhen, the preset electronic fence is Shenzhen. The other is that the preset electronic fence may include a preset inner fence and a preset outer fence, and a range of the preset outer fence is greater than a range of the preset inner fence. For example, if the vehicle is rent to Shenzhen, the preset outer fence may be Guangdong province, and the preset inner fence may be Shenzhen. The foregoing examples are only used for description, and are not limited in this disclosure.

In this step, an administrator may select a fence-addition button in an electronic fence through an application interface provided by the monitoring server, draw one preset electronic fence on a map by using a mouse, and click a saving button to complete drawing of the preset electronic fence. Then, the administrator may perform a binding operation on the preset electronic fence and identification information of the vehicle. Specifically, the administrator selects the specified preset electronic fence, selects the identification information of the vehicle in batch to perform the binding, and click the saving button to complete the binding between the preset electronic fence and the identification information of the vehicle. In this way, the preset electronic fence bound with the identification information of the vehicle may be sent to the control server, so that in subsequent steps, the control server may deliver the preset electronic fence to the in-vehicle terminal corresponding to the identification information of the vehicle.

It should be noted that, when the preset electronic fence changes, for example, a vehicle is sold from Shenzhen to Nanjing, the preset electronic fence corresponding to the vehicle changes from Shenzhen to Nanjing. In this way, the administrator may modify the preset electronic fence that is previously set on the application interface provided by the monitoring server. The monitoring server sends the modified preset electronic fence to the control server, thereby ensuring that the preset electronic fence stored by the in-vehicle terminal is more accurate.

S302. After receiving the preset electronic fence sent by the monitoring server, the control server determines whether a connection between the control server and the in-vehicle terminal is normal.

In this step, the in-vehicle terminal is a terminal corresponding to the identification information of the vehicle that is bound with the preset electronic fence. In a possible implementation, the control server may send a connection request message to the in-vehicle terminal, and determine whether a response message sent by the in-vehicle terminal in response to the connection request message is received within a preset time. After the response message sent by the in-vehicle terminal in response to the connection request message is received, it is determined that the connection between the control server and the in-vehicle terminal is normal.

When it is determined that the connection between the control server and the in-vehicle terminal is normal, steps S303 and S304, and steps S306 and S307 are performed.

When it is determined that the connection between the control server and the in-vehicle terminal is abnormal, step S305 to step S307 are performed.

It should be noted that, when it is determined that the connection between the control server and the in-vehicle terminal is abnormal, the control server may send a notification message to the monitoring server. For example, the notification message may be that: the in-vehicle terminal is not online, and delivering of the preset electronic fence fails. Therefore, the administrator is informed by using the monitoring server that the delivering of the preset electronic fence fails.

S303. The control server sends the preset electronic fence to the in-vehicle terminal.

S304. After receiving the preset electronic fence sent by the control server, the in-vehicle terminal stores the preset electronic fence.

S305. The in-vehicle terminal obtains the preset electronic fence that is locally stored.

S306. The in-vehicle terminal obtains current position information of the vehicle, and determines a travel direction of the vehicle according to the current position information.

The position information may be global positioning system (GPS) information. In this step, previous position information of the vehicle may be obtained, and the travel direction of the vehicle is determined according to the previous position information and the current position information.

S307. Determine, according to the travel direction, whether the vehicle travels from the inside of the preset electronic fence to the outside of the preset electronic fence.

When it is determined, according to the travel direction, that the vehicle travels from the inside of the preset electronic fence to the outside of the preset electronic fence, step S308 is performed.

When it is determined, according to the travel direction, that the vehicle travels from the outside of the preset electronic fence to the inside of the preset electronic fence, step S306 is performed.

S308. Determine a current position state of the vehicle according to the current position information.

The position state represents a relative position of the vehicle and the preset electronic fence. It should be noted that, when the preset electronic fence includes one fence, if the current position information is located inside the preset electronic fence, it may be determined that the current position state of the vehicle is that the vehicle is located inside the preset electronic fence. If the current position information is located outside the preset electronic fence, it is determined that the current position state of the vehicle is that the vehicle is located outside the preset electronic fence. When the preset electronic fence includes a preset inner fence and a preset outer fence, if the current position information is located inside the preset inner fence, it is determined that the current position state of the vehicle is that the vehicle is located inside the preset inner fence. If the current position information is located between the preset inner fence and the preset outer fence, it is determined that the current position state of the vehicle is that the vehicle is located outside the preset inner fence and located inside the preset outer fence. If the current position information is located outside the preset outer fence, it is determined that the current position state of the vehicle is that the vehicle is located outside the preset outer fence.

S309. The in-vehicle terminal determines whether the current position state is the same as a previous position state.

When the current position state is different from the previous position state, step S310 is performed.

When the current position state is the same as the previous position state, step S311 is performed.

S310. The in-vehicle terminal performs one or two of outputting warning information and sending a key shielding signal, to control a key controller to shield a key control signal of the vehicle.

When the preset electronic fence includes one preset fence, if the in-vehicle terminal determines, according to the current position state and the previous position state, that the vehicle is driven out of the preset electronic fence, the in-vehicle terminal may send the key shielding signal, to enable the key controller to shield the key control signal of the vehicle, or output the warning information and send the key shielding signal, to enable the key controller to shield the key control signal of the vehicle.

When the preset electronic fence includes a preset inner fence and a preset outer fence, if the current position state is that the vehicle is located outside the preset inner fence and located inside the preset outer fence, the in-vehicle terminal may output the warning information. If the current position state is that the vehicle is located outside the preset outer fence, the in-vehicle terminal may control the key controller to shield the key control signal of the vehicle, or output the warning information and send the key shielding signal, to enable the key controller to shield the key control signal of the vehicle. In this way, if a driver drives the vehicle from the inside of the preset inner fence to a position between the preset inner fence and the preset outer fence, the in-vehicle terminal may automatically warn the driver, so that the driver timely adjusts a travel path, thereby avoiding a problem that the vehicle cannot normally travel due to shielding of the key control signal caused by the driver driving the vehicle out of the preset outer fence by mistake.

In this step, the key control signal of the vehicle may be a radio signal. In this way, after an antenna on the vehicle receives the radio signal, a key identification number included in the radio signal is identified by an electronic control unit (ECU). When the key identification number meets preset code, the vehicle is controlled to perform a corresponding operation (for example, unlocking or locking). To shield the key control signal, in a possible implementation, the key controller may interfere with the key control signal of the vehicle by outputting an interference signal whose frequency is the same as that of the radio signal, so that the antenna cannot accurately receive the radio signal. The method for shielding the key control signal is only used for description, and is not limited in this disclosure.

It should be noted that, to enable the administrator to manage the vehicle better, in a possible implementation, when the in-vehicle terminal outputs the warning information or controls the key controller to shield the key control signal of the vehicle, alarm information may be sent to the monitoring server, so that the administrator may timely pay attention to a travel state of the vehicle.

In addition, because when the in-vehicle terminal controls the key controller to shield the key control signal of the vehicle, if the driver travels on a road such as an expressway, a traffic accident may occur. To resolve the foregoing problem, in another embodiment of this disclosure, the in-vehicle terminal may determine whether the vehicle is shut down. When the vehicle is shut down, the in-vehicle terminal controls the key controller to shield the key control signal of the vehicle. In this way, a danger caused by sudden shielding of the key control signal when the vehicle is not shut down is avoided. Certainly, in another possible implementation, a signal that whether the vehicle is shut down may be obtained in real time by using the key controller, and when the vehicle is shut down, the shutdown signal is sent to the in-vehicle terminal, so that the in-vehicle terminal controls the key controller according to the shutdown signal, to shield the key control signal of the vehicle. The example is only used for description, and is not limited in this disclosure.

S311. The in-vehicle terminal does not perform any operation.

It should be noted that, for brief description, the foregoing method embodiments are expressed as a combination of a series of actions. However, a person skilled in the art should know that this disclosure is not limited to the described sequence of actions. In addition, a person skilled in the art should also know that all the embodiments described in this specification are exemplary embodiments, and the related actions and modules are not necessarily required in this disclosure.

By using the above method, according to position states of the vehicle, the in-vehicle terminal may automatically output the warning information or control the key controller to shield the key control signal of the vehicle without manual intervention, thereby saving human resources.

Based on the method for controlling a vehicle in the foregoing embodiments, some embodiments of this disclosure provide a non-temporary computer-readable storage medium, storing a computer program. The computer program, when executed by a processor, implements the foregoing method for controlling a vehicle described in the first aspect of the embodiments.

The non-temporary computer-readable storage medium in this disclosure stores the computer program for implementing the foregoing method for controlling a vehicle described in the first aspect of the embodiments, thereby providing support to implement the foregoing method for controlling a vehicle.

Figure 4:
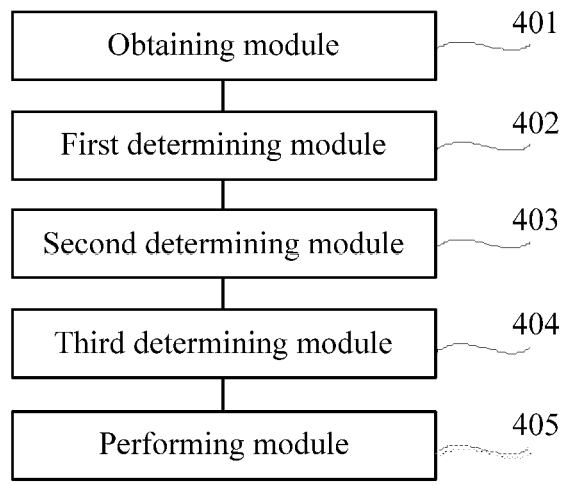
FIG. 4 is a block diagram of an apparatus for controlling a vehicle according to an embodiment of this disclosure.

The second aspect of the embodiments of this disclosure provides an apparatus for controlling a vehicle. FIG. 4 shows an apparatus for controlling a vehicle according to an exemplary embodiment. As shown in FIG. 4, the apparatus is applied to an in-vehicle terminal, and includes:

an obtaining module 401, configured to obtain current position information of a vehicle and a preset electronic fence;

a first determining module 402, configured to determine a travel direction of the vehicle according to the current position information and the preset electronic fence;

a second determining module 403, configured to determine a current position state of the vehicle according to the current position information when it is determined that the vehicle travels from the inside of the preset electronic fence to the outside of the preset electronic fence, where the position state represents a relative position of the vehicle and the preset electronic fence;

a third determining module 404, configured to determine whether the current position state is the same as a previous position state of the vehicle; and a performing module 405, configured to: when the current position state is different from the previous position state, perform one or two of outputting warning information and sending a key shielding signal, to enable a key controller to shield a key control signal of the vehicle.

In some embodiments, the second determining module 403 is configured to: when the current position information is located inside the preset electronic fence, determine that the current position state of the vehicle is that the vehicle is located inside the preset electronic fence; or when the current position information is located outside the preset electronic fence, determine that the current position state of the vehicle is that the vehicle is located outside the preset electronic fence.

In some embodiments, when performing one or two of outputting the warning information and sending the key shielding signal, to enable the key controller to shield the key control signal of the vehicle, the performing module 405 is specifically configured to: when the current position state is that the vehicle is located outside the preset electronic fence, send the key shielding signal, to enable the key controller to shield the key control signal of the vehicle, or output the warning information and send the key shielding signal, to enable the key controller to shield the key control signal of the vehicle.

In some embodiments, the preset electronic fence includes a preset inner fence and a preset outer fence, and the second determining module 403 is configured to: when the current position information is located inside the preset inner fence, determine that the current position state of the vehicle is that the vehicle is located inside the preset inner fence; or when the current position information is located between the preset inner fence and the preset outer fence, determine that the current position state of the vehicle is that the vehicle is located outside the preset inner fence and located inside the preset outer fence; or when the current position information is located outside the preset outer fence, determine that the current position state of the vehicle is that the vehicle is located outside the preset outer fence.

In some embodiments, the performing module 405 is configured to: when the current position state is that the vehicle is located outside the preset inner fence and located inside the preset outer fence, output the warning information; or when the current position state is that the vehicle is located outside the preset outer fence, send the key shielding signal, to enable the key controller to shield the key control signal of the vehicle, or output the warning information and send the key shielding signal, to enable the key controller to shield the key control signal of the vehicle.

Figure 5:
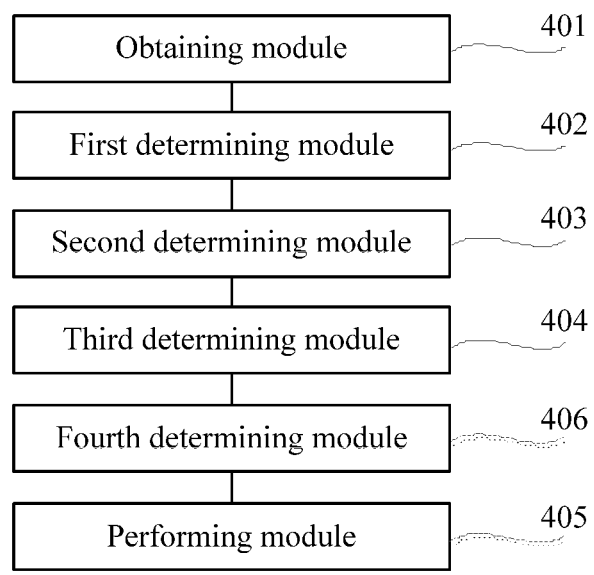
FIG. 5 is a block diagram of an apparatus for controlling a vehicle according to an embodiment of this disclosure.
Figure 6:
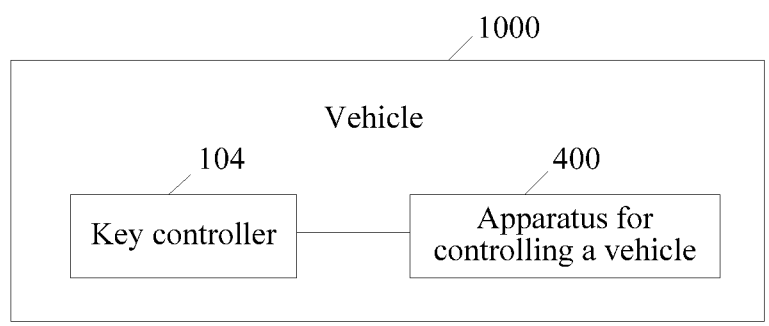
FIG. 6 is a block diagram of a vehicle according to an embodiment of this disclosure.

FIG. 5 shows an apparatus for controlling a vehicle according to an exemplary embodiment. As shown in FIG. 5, the apparatus in the embodiments of this disclosure further includes: a fourth determining module 406, configured to determine whether the vehicle is shut down; and the performing module 405, configured to: when it is determined that the vehicle is shut down, send the key shielding signal, to enable the key controller to shield the key control signal of the vehicle.

In some embodiments, the apparatus for controlling a vehicle further includes: an uploading module. The uploading module is configured to: when the performing module 405 performs one or two of outputting the warning information and sending the key shielding signal, upload alarm information to a monitoring server to remind a vehicle administrator.

By using the above apparatus, according to position states of the vehicle, the in-vehicle terminal may automatically output the warning information or control the key controller to shield the key control signal of the vehicle without manual intervention, thereby saving human resources.

Based on the apparatus for controlling a vehicle in the foregoing embodiments, the third aspect of the embodiments of this disclosure further provides a vehicle.

The vehicle 1000 in this disclosure includes a key controller 104 and an apparatus 400 for controlling a vehicle in the foregoing embodiments. The apparatus 400 for controlling a vehicle is applied to an in-vehicle terminal, and the key controller 104 is connected to the apparatus 400 for controlling a vehicle. For a specific working process of the apparatus 400 for controlling a vehicle, reference may be made to the descriptions in the foregoing embodiments.

In the vehicle of this disclosure, by using the apparatus for controlling a vehicle in the foregoing embodiments, automatic management and control for the vehicle can be implemented without manual intervention, which saves more time and effort than manual management and control.

It should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, a process, a method, an object, or a device that includes a series of elements not only includes such elements, but also includes other elements not listed explicitly, or may include inherent elements of the process, method, object, or device. Without more restrictions, an element limited by "include a/an . . . " does not exclude other same elements existing in the process, the method, the object, or the device that includes the element.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining the instruction execution system, apparatus, or device. In the context of this specification, a "computer-readable medium" may be any apparatus that can include, store, communicate, propagate, or transmit the program for use by the instruction execution system, apparatus, or device or that is to be used by combining the instruction execution system, apparatus, or device. More specific examples (a non-exhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer readable medium may be even a piece of paper for printing the program, or another proper medium, because, for example, optical scanning may be performed on the paper or another medium, processing is performed next by performing editing and decryption, or in another proper manner when necessary to obtain the program in an electronic manner, and then the program is stored in a computer memory.

It should be understood that parts of this disclosure may be implemented by using hardware, software, firmware, or a combination thereof. In the foregoing implementations, a plurality of steps or methods may be implemented by using software or firmware that is stored in a memory and executed by a proper instruction execution system. For example, if being implemented by hardware, like another implementation, the plurality of steps or methods may be implemented by any one of the following technologies known in the art or a combination thereof: a discrete logic circuit of a logic gate circuit for realizing a logic function for a data signal, an application specific integrated circuit having a suitable combined logic gate circuit, a programmable gate array (PGA), a field programmable gate array (FPGA), and the like.

In the descriptions of this specification, descriptions of reference terms such as "one embodiment", "some embodiments", "example", "specific example" or "some examples" mean that specific features, structures, materials, or characteristics described in the embodiment or example are included in at least one embodiment or example of this disclosure. In this specification, schematic descriptions of the foregoing terms are not necessarily for the same embodiment or example. In addition, the described specific features, structures, materials, or characteristics may be combined in a proper manner in any one or more embodiments or examples. In addition, in a case that is not mutually contradictory, a person skilled in the art may combine or group different embodiments or examples that are described in this specification and features of the different embodiments or examples.

Although the embodiments of this disclosure are shown and described above, it can be understood that, the foregoing embodiments are exemplary, and cannot be construed as a limitation to this disclosure. Within the scope of this disclosure, a person of ordinary skill in the art may make changes, modifications, replacements, and variations to the foregoing embodiments.

What is claimed is:

1. A method for controlling a vehicle, applied to an in-vehicle terminal, wherein the method comprises:
   obtaining current position information of a vehicle and a preset electronic fence with a preset inner fence and a preset outer fence, and determining a travel direction of the vehicle according to the current position information and the preset electronic fence;
   determining a current position state of the vehicle according to the current position information when it is determined, according to the travel direction of the vehicle, that the vehicle travels from the inside of the preset electronic fence to the outside of the preset electronic fence, wherein the position state represents a relative position of the vehicle and the preset electronic fence, wherein:
      when the current position information is located inside the preset inner fence, the current position state of the vehicle is that the vehicle is located inside the preset inner fence; or
      when the current position information is located between the preset inner fence and the preset outer fence, the current position state of the vehicle is that the vehicle is located outside the preset inner fence and located inside the preset outer fence; or
      when the current position information is located outside the preset outer fence, the current position state of the vehicle is that the vehicle is located outside the preset outer fence;
   determining whether the current position state is the same as a previous position state of the vehicle; and
   when the current position state is different from the previous position state, performing at least one of outputting warning information and sending a key shielding signal to enable a key controller to shield a key control signal of the vehicle.

2. The method for controlling a vehicle according to claim 1, wherein the step of performing at least one of outputting warning information and sending a key shielding signal to enable the key controller to shield the key control signal comprises:
   when the current position state is that the vehicle is located outside the preset inner fence and located inside the preset outer fence, outputting the warning information; or
   when the current position state is that the vehicle is located outside the preset outer fence, outputting the warning information and sending the key shielding signal to enable the key controller to shield the key control signal of the vehicle.

3. The method for controlling a vehicle according to claim 1, wherein before the step of sending the key shielding signal to enable the key controller to shield the key control signal of the vehicle, the method further comprises:
   determining whether the vehicle is shut down; and
   wherein the step of performing at least one of outputting warning information and sending the key shielding signal to enable the key controller to shield the key control signal comprises:
      when it is determined that the vehicle is shut down, sending the key shielding signal to enable the key controller to shield the key control signal of the vehicle.

4. The method for controlling a vehicle according to claim 1, wherein the method further comprises:
   after the step of performing at least one of outputting warning information and sending a key shielding signal to enable the key controller to shield the key control signal, uploading alarm information to a monitoring server to remind a vehicle administrator.

5. The method for controlling a vehicle according to claim 1, wherein when the current position state is different from the previous position state and the current position state of the vehicle is that the vehicle is located outside the preset inner fence and located inside the preset outer fence, outputting warning information.

6. The method for controlling a vehicle according to claim 1, wherein when the current position state is different from the previous position state and the current position state of the vehicle is that the vehicle is located outside the preset outer fence, outputting warning information and sending a key shielding signal.

7. An apparatus for controlling a vehicle, applied to an in-vehicle terminal, wherein the apparatus comprises:
   an obtaining module, configured to obtain current position information of a vehicle and a preset electronic fence with a preset inner fence and a preset outer fence;
   a first determining module, configured to determine a travel direction of the vehicle according to the current position information and the preset electronic fence;
   a second determining module, configured to determine a current position state of the vehicle according to the current position information when it is determined that the vehicle travels from inside one of the preset inner fence and the preset outer fence to outside one of the preset inner fence and the preset outer fence, wherein the position state represents a relative position of the vehicle and the preset electronic fence, wherein the second determining module is further configured to:
      when the current position information is located inside the preset inner fence, determine that the current position state of the vehicle is that the vehicle is located inside the preset inner fence; or
      when the current position information is located between the preset inner fence and the preset outer fence, determine that the current position state of the vehicle is that the vehicle is located outside the preset inner fence and located inside the preset outer fence; or
      when the current position information is located outside the preset outer fence, determine that the current position state of the vehicle is located outside the preset outer fence;
   a third determining module, configured to determine whether the current position state is the same as a previous position state of the vehicle; and
   a performing module, configured to: when the current position state is different from the previous position state, perform at least one of outputting warning information and sending a key shielding signal to enable a key controller to shield a key control signal of the vehicle.

8. The apparatus for controlling a vehicle according to claim 7, when performing at least one of the following steps to enable the key controller to shield the key control signal of the vehicle: outputting warning information; and sending the key shielding signal, the performing module is configured to:
   when the current position state is that the vehicle is located outside the preset electronic fence, send the key shielding signal to enable the key controller to shield the key control signal of the vehicle, or output the warning information and send the key shielding signal to enable the key controller to shield the key control signal of the vehicle.

9. The apparatus for controlling a vehicle according to claim 8, wherein the apparatus further comprises:
a fourth determining module, configured to determine whether the vehicle is shut down, wherein
the performing module is configured to: when it is determined that the vehicle is shut down, send the key shielding signal to enable the key controller to shield the key control signal of the vehicle.

10. The apparatus for controlling a vehicle according to claim 7, wherein the performing module is configured to:
when the current position state is that the vehicle is located outside the preset inner fence and located inside the preset outer fence, output the warning information; or
when the current position state is that the vehicle is located outside the preset outer fence, output the warning information and send the key shielding signal to enable the key controller to shield the key control signal of the vehicle.

11. The apparatus for controlling a vehicle according to claim 10, wherein the apparatus further comprises:
a fourth determining module, configured to determine whether the vehicle is shut down, wherein
the performing module is configured to: when it is determined that the vehicle is shut down, send the key shielding signal to enable the key controller to shield the key control signal of the vehicle.

12. The apparatus for controlling a vehicle according to claim 11, wherein the apparatus further comprises:
an uploading module, configured to: when the performing module performs at least one of outputting warning information and sending the key shielding signal to enable the key controller to shield the key control signal of the vehicle, upload alarm information to a monitoring server to remind a vehicle administrator.

13. The apparatus for controlling a vehicle according to claim 7, wherein the apparatus further comprises:
a fourth determining module, configured to determine whether the vehicle is shut down, wherein
the performing module is configured to: when it is determined that the vehicle is shut down, send the key shielding signal to enable the key controller to shield the key control signal of the vehicle.

14. The apparatus for controlling a vehicle according to claim 7, wherein the apparatus further comprises:
an uploading module, configured to: when the performing module performs at least one of outputting warning information and sending the key shielding signal to enable the key controller to shield the key control signal of the vehicle, upload alarm information to a monitoring server to remind a vehicle administrator.

15. A vehicle, comprising a key controller and the apparatus for controlling a vehicle according to claim 7, wherein the key controller is connected to the apparatus for controlling a vehicle.

16. The apparatus for controlling a vehicle according to claim 7, wherein when the determining module determines the current position state of the vehicle is that the vehicle is located outside the preset inner fence and located inside the preset outer fence and when the current position state is different from the previous position state, the performing module outs warning information.

17. The apparatus for controlling a vehicle according to claim 7, wherein when the determining module determines the current position state of the vehicle is that the vehicle is located outside the preset outer fence and when the current position state is different from the previous position state, the performing module sends a key shielding signal.

\* \* \* \* \*